(12) United States Patent
Hancock et al.

(10) Patent No.: US 10,053,081 B2
(45) Date of Patent: Aug. 21, 2018

(54) HYBRID ELECTRIC VEHICLE CONTROLLER AND METHOD

(71) Applicant: Jaguar Land Rover Limited, Coventry (GB)

(72) Inventors: Matthew Hancock, Coventry (GB); Steve Liggins, Coventry (GB); Simon Message, Coventry (GB); Manoj Lao, Coventry (GB); Geoff Hannis, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 148 days.

(21) Appl. No.: 14/910,814

(22) PCT Filed: Aug. 20, 2014

(86) PCT No.: PCT/EP2014/067752
§ 371 (c)(1),
(2) Date: Feb. 8, 2016

(87) PCT Pub. No.: WO2015/024971
PCT Pub. Date: Feb. 26, 2015

(65) Prior Publication Data
US 2016/0193992 A1    Jul. 7, 2016

(30) Foreign Application Priority Data

Aug. 21, 2013  (GB) .................................. 1314990.1

(51) Int. Cl.
*B60L 9/00* (2006.01)
*B60L 11/00* (2006.01)
(Continued)

(52) U.S. Cl.
CPC ............... *B60W 20/13* (2016.01); *B60K 6/48* (2013.01); *B60K 6/52* (2013.01); *B60W 10/06* (2013.01);
(Continued)

(58) Field of Classification Search
CPC ......... B60W 20/13; B60W 20/11; B60K 6/48; Y02T 10/56
(Continued)

(56) References Cited

U.S. PATENT DOCUMENTS 6,941,198 B2 * 9/2005 Brigham .................. B60K 6/48
                                                    180/65.25
2009/0101421 A1   4/2009 Oyobe et al.
(Continued)

FOREIGN PATENT DOCUMENTS

CN    101687507 A    3/2010
EP    2 168 828 A1   3/2010
(Continued)

OTHER PUBLICATIONS

Combined Search and Examination Report, GB 1414794.6, dated Feb. 25, 2015, 5 pages.
(Continued)

*Primary Examiner* — Isaac G Smith
(74) *Attorney, Agent, or Firm* — Myers Bigel, P.A.

(57) ABSTRACT

The invention relates to a controller for a hybrid electric vehicle having an engine, electric propulsion means powered by energy storage means and electric generator means operable to be driven by the engine to recharge the energy storage means, the controller being operable to: receive a signal indicative of a required hybrid driving mode; receive a signal indicative of a state of charge of the energy storage means; determine which of a plurality of powertrain operating modes is appropriate for vehicle operation at a given
(Continued)

moment, the powertrain operating modes including an engine charging mode in which the engine drives the generator means to recharge the energy storage means and an electric vehicle (EV) mode in which the engine is switched off and the electric propulsion means is operable to develop drive torque to drive the vehicle; and cause the powertrain to assume the appropriate powertrain operating mode and the required hybrid driving mode, wherein the controller is operable to determine which of the plurality of powertrain operating modes is appropriate for vehicle operation in dependence at least in part on the signal indicative of the instant state of charge of the energy storage means and a reference value of state of charge, the controller being operable to set the reference value of state of charge to one of a plurality of different respective values in dependence on the signal indicative of the required hybrid driving mode.

20 Claims, 3 Drawing Sheets

(51) Int. Cl.

| | | |
|---|---|---|
| *G05D 1/00* | (2006.01) | |
| *B60W 20/13* | (2016.01) | |
| *B60K 6/48* | (2007.10) | |
| *B60K 6/52* | (2007.10) | |
| *B60W 20/11* | (2016.01) | |
| *B60W 20/16* | (2016.01) | |
| *B60W 20/17* | (2016.01) | |
| *B60W 10/06* | (2006.01) | |
| *B60W 10/08* | (2006.01) | |
| *B60W 10/26* | (2006.01) | |
| *B60W 20/20* | (2016.01) | |
| *B60W 50/08* | (2012.01) | |

(52) U.S. Cl.
CPC ............ *B60W 10/08* (2013.01); *B60W 10/26* (2013.01); *B60W 20/11* (2016.01); *B60W 20/16* (2016.01); *B60W 20/17* (2016.01); *B60W 20/20* (2013.01); *B60W 50/082* (2013.01); *B60W 2510/244* (2013.01); *B60W 2540/00* (2013.01); *B60W 2540/04* (2013.01); *B60W 2710/0666* (2013.01); *B60W 2710/083* (2013.01); *Y02T 10/56* (2013.01); *Y02T 10/6221* (2013.01); *Y02T 10/6265* (2013.01); *Y02T 10/84* (2013.01); *Y10S 903/93* (2013.01)

(58) Field of Classification Search
USPC .......................................... 701/22; 180/65.21
See application file for complete search history.

(56) References Cited

U.S. PATENT DOCUMENTS

| | | |
|---|---|---|
| 2010/0145560 A1 | 6/2010 | Komatsu et al. |
| 2011/0160019 A1 | 6/2011 | Harada |
| 2011/0166733 A1 | 7/2011 | Yu et al. |
| 2013/0030635 A1* | 1/2013 | Morita ................... B60K 6/445 701/22 |
| 2013/0038439 A1* | 2/2013 | Saito ...................... B60K 6/445 340/439 |
| 2013/0073135 A1* | 3/2013 | Blasinski .............. B60W 10/06 701/22 |
| 2013/0166125 A1 | 6/2013 | Yamamoto et al. |
| 2013/0184915 A1* | 7/2013 | Boskovitch ........... B60W 20/00 701/22 |
| 2013/0218386 A1* | 8/2013 | Fisker ...................... B60K 6/46 701/22 |
| 2013/0332015 A1 | 12/2013 | Dextreit |

FOREIGN PATENT DOCUMENTS

| | | | | |
|---|---|---|---|---|
| EP | 2 559 578 A1 | | 2/2013 | |
| GB | 2 483 371 A | | 3/2012 | |
| GB | 2483371 A | * | 3/2012 | ............. B60K 6/448 |
| GB | 2 486 709 A | | 6/2012 | |
| JP | 2009-143563 | | 7/2009 | |
| JP | 2010-58640 A | | 3/2010 | |
| JP | 2011-57117 A | | 3/2011 | |
| JP | 2012-30667 A | | 2/2012 | |
| JP | 2013-129312 A | | 7/2013 | |

OTHER PUBLICATIONS

Combined Search and Examination Report, GB 1314990.1, dated Mar. 19, 2014, 6 pages.
Notification of Transmittal of the International Search Report and the Written Opinion, PCT/EP2014/067752, dated Jun. 18, 2015, 16 pages.
First Office Action corresponding to Chinese Application No. 201480045864.3 dated May 2, 2017.
Office Action and English language translation, JP Application No. 2016-535471, dated Dec. 5, 2017, 6 pp.

* cited by examiner

FIGURE 1

VSC Behaviour in SEV

| Mode | Customer Behaviour Changes (vs. std) | HEV System Behaviour Changes | |
|------|--------------------------------------|------------------------------|---|
| SEV | | | Nominal SOC setpoint increased to ~60%. |
| | EV availability significantly increased | Charging load with engine running greater than default mode. | |
| | | Engine forced on above ~35mph with accel pedal pressed. | |
| | | Engine less likely to latch on in corners. | Cornering inhibit thresholds SEV dependent. |
| | | Battery fully charged when in P/N after min SOC reached or when engine revved. | P/N charge mode and SOC target cal made SEV dependent. |
| | Reduced time with EV not available after min SOC reached. | Battery charges at all times in low SOC latch (35% - 41%). Stop start less accessible. | Stop start threshold dependent on SEV mode. |
| | | | Stationary charging enable flag SEV dependent. |
| | | | Vehicle speed threshold for shutdown in latch SEV dependent. |
| | | | Overrun charging switched on in SEV only. |
| | Maximum performance less accessible (preserving SOC for EV mode). | EM torque boost only available with high pedal input / kickdown | Max PT torque from VSC made pedal and mode dependent. |
| | Transient performance reduced (preserving SOC for EV mode) | Torque filling restricted in SEV. | Torque fill level made calibratable dependent on mode |

FIGURE 4

HYBRID ELECTRIC VEHICLE CONTROLLER AND METHOD

RELATED APPLICATIONS

This application is a 35 U.S.C. § 371 national stage application of PCT Application No. PCT/EP2014/067752, filed on Aug. 20, 2014, which claims priority from Great Britain Patent Application No. 1314990.1 filed on Aug. 21, 2013, the contents of which are incorporated herein by reference in their entireties. The above-referenced PCT International Application was published in the English language as International Publication No. WO 2015/024971 A2 on Feb. 26, 2015.

TECHNICAL FIELD

The present invention relates to controllers for hybrid electric vehicles. In particular embodiments of the invention relate to controllers for hybrid electric vehicles operable in a parallel mode.

BACKGROUND

It is known to provide a hybrid electric vehicle having an internal combustion engine operable to provide drive torque to drive the vehicle and an electrical propulsion motor operable to provide drive torque when the vehicle is operated in an electric vehicle (EV) mode. A vehicle control system determines when to switch the internal combustion engine on or off, and when to open or close a clutch KO between the engine and a transmission. In some vehicles the electric propulsion motor is integrated into the transmission.

It is also known to provide an electric machine as a starter for cranking the engine when an engine start is required. Known starters include belt-integrated starter/generators. Such devices are operable as electrical generators driven by the engine as well as a starter. The vehicle may include a belt integrated starter generator in addition to a starter for starting the engine, in some embodiments.

SUMMARY OF THE INVENTION

Embodiments of the invention may be understood with reference to the appended claims.

Aspects of the present invention provide a control system, a vehicle and a method.

In one aspect of the invention for which protection is sought there is provided a controller for a hybrid electric vehicle having an engine, electric propulsion means powered by energy storage means and electric generator means operable to be driven by the engine to recharge the energy storage means, the controller being operable to:
  receive a signal indicative of a required hybrid driving mode;
  receive a signal indicative of a state of charge of the energy storage means;
  determine which of a plurality of powertrain operating modes is appropriate for vehicle operation at a given moment, the powertrain operating modes including an engine charging mode in which the engine drives the generator means to recharge the energy storage means and an electric vehicle (EV) mode in which the engine is switched off and the electric propulsion means is operable to develop drive torque to drive the vehicle;
  and cause the powertrain to assume the appropriate powertrain operating mode and the required hybrid driving mode,
  wherein the controller is operable to determine which of the plurality of powertrain operating modes is appropriate for vehicle operation in dependence at least in part on the signal indicative of the instant state of charge of the energy storage means and a reference value of state of charge, the controller being operable to set the reference value of state of charge to one of a plurality of different respective values in dependence on the signal indicative of the required hybrid driving mode.

Embodiments of the present invention have the advantage that the operating mode of the powertrain at a given moment in time may be influenced by adjustment of the reference value of the state of charge depending on the selected hybrid driving mode. Thus, in some embodiments the controller may be configured to favour operation of the powertrain in the EV mode when a particular driving mode is selected. Thus if a user wishes to enjoy vehicle operation in EV mode more than a mode in which the engine is switched on, the user may select a corresponding hybrid driving mode.

It is to be understood that reference to an instant state of charge is to be understood to mean a prevailing or current state of charge of the energy storage means. The instant state of charge may be the most recently available measured value of state of charge of the energy storage means in some embodiments.

The engine may be an internal combustion engine. The engine may be petrol fired or diesel fired. Other arrangements are also useful.

The controller may be operable to determine the appropriate powertrain operating mode in dependence at least in part on a deviation of the signal indicative of the instant state of charge from the reference value of state of charge.

It is to be understood that in some embodiments the controller may be arranged to promote charging of the energy storage means to a higher state of charge when the powertrain is in the engine charging mode, thus favouring operation of the powertrain in the EV mode for longer periods when the engine is switched off.

The controller may be operable to determine which of the powertrain operating modes is appropriate at a given moment in time according to a value of a cost function for each powertrain operating mode, the value of the cost function being determined at least in part by reference to the signal indicative of the instant state of charge and the reference value of state of charge of the respective powertrain operating modes.

Optionally, the value of the cost function of each powertrain operating mode is determined at least in part in further dependence on at least one selected from amongst a rate of fuel consumption of the vehicle, a rate of emission of a gas by the vehicle and an amount of noise generated by the vehicle.

The controller may be configured to determine the required powertrain operating mode according to a feedback Stackelberg equilibrium control optimisation methodology.

Such a methodology is known, and may be understood for example by reference to UK patent application GB1115248.5.

In some embodiments, the cost function is responsive at least in part to a rate of fuel consumption of the vehicle, a rate of emission of a gas by the vehicle and/or a deviation of a state of charge of the energy storage means from the reference value.

The controller may be arranged to receive a signal indicative of the required hybrid driving mode from a user.

That is, the user may input a signal indicative of the required hybrid driving mode.

Optionally, the hybrid driving modes include a first driving mode favouring prolonged operation in EV mode, and a second driving mode favouring a reduction in fuel consumption, wherein the value of reference state of charge in the first driving mode is higher than that in the second driving mode.

The first mode may correspond to a selectable electric vehicle (SEV) mode. The second mode may correspond to a general or default hybrid electric vehicle (HEV) driving mode. In embodiments, other modes may be available and/or useful.

Advantageously, when the powertrain is in the EV powertrain mode the controller may be operable to cause the powertrain to assume the engine charging powertrain mode in dependence at least in part on driver torque demand. If the vehicle is in the first mode and the powertrain is in the EV powertrain mode, the controller may be arranged to cause the powertrain to switch from the EV mode to the engine charging powertrain mode only above a threshold value of driver torque demand that is higher than that when the vehicle is operating in the second mode.

Advantageously, when the powertrain is in the engine charging operating mode the controller may be configured to cause the generator means to apply a greater charging load to the engine when the vehicle is in the first driving mode compared with the second driving mode.

This feature has the advantage that, because the energy storage means is charged more aggressively in the first mode, the state of charge increases more quickly, enabling the vehicle to spend a greater amount of time in the EV powertrain operating mode.

Optionally when the powertrain is in the EV operating mode the controller is operable to cause the engine to switch on when vehicle speed exceeds a prescribed value, the prescribed value being higher when the vehicle is operating in the first mode relative to the second mode.

The prescribed vehicle speed for engine start may be gradient dependent. That is, the threshold may be greater when the vehicle is descending a hill compared with travel over flat terrain, or uphill. The speed may increase with increasing downhill gradient steepness.

The engine may be switched on to provide drive torque in the case of a parallel hybrid vehicle, or so that the powertrain can assume the engine charging mode in the case of a parallel hybrid electric vehicle or a series hybrid electric vehicle.

Optionally, when the controller causes the vehicle to operate in the first mode or the second mode the controller causes the engine to turn on in dependence at least in part on an amount by which an accelerator pedal is depressed.

If the accelerator pedal is not depressed, or depressed by less than a threshold amount, the controller may cause the powertrain to remain in the EV mode. Thus if a vehicle speed increases above a turn-on threshold due to coasting downhill, the vehicle may remain in the EV mode.

Optionally the state of charge of the energy storage means is permitted to take a value from a prescribed absolute minimum state of charge to a prescribed soft minimum value greater than the prescribed absolute minimum state of charge only when the vehicle is operating in the first hybrid operating mode or upon vehicle initialisation.

The magnitude of the interval from the prescribed absolute minimum state of charge to the prescribed soft minimum value may be approximately 10% of the magnitude of the interval from the prescribed absolute minimum state of charge to a prescribed absolute maximum state of charge.

This has the benefit that the powertrain is more likely to operate in the EV mode when the driver selects the first mode because the interval of state of charge values below the soft minimum value (that is, in the so-called 'reserved' interval) will normally be available for use. The reserved interval may be used automatically upon vehicle initialisation thus providing a smooth vehicle departure from rest. Once the vehicle has operated in the reserved interval, the controller may subsequently inhibit vehicle operation in said reserved interval when the state of charge value increases above the prescribed soft minimum value. This helps to some extent to ensure that the driver does not experience prolonged periods when the engine is on and/or periods where a greater charging load to the engine is applied when the vehicle is no longer operating in the first mode.

The controller may be operable to cause the engine to be drivably coupled to one or more wheels of the vehicle in addition to the electric propulsion means.

Thus the controller may be suitable for controlling a parallel hybrid vehicle.

The controller may be operable to cause the engine to deliver drive torque when the powertrain is operated in the engine charging mode.

The controller may be operable to cause the powertrain to operate in a parallel boost mode in which the engine delivers drive torque in addition to the electric propulsion means.

In a further aspect of the invention for which protection is sought there is provided a hybrid electric vehicle powertrain comprising a controller according to a preceding aspect.

Optionally, the electric generator means and the electric propulsion means are each provided by an electric machine.

The controller may be operable to cause the electric machine to be operated as a propulsion motor or a generator.

The generator means may comprise an electric generator and the electric propulsion means may comprise a propulsion motor.

In a further aspect of the invention there is provided a hybrid electric vehicle comprising a controller or a powertrain according to a preceding aspect.

The vehicle may be operable in a parallel mode in which the engine delivers drive torque to the powertrain.

The vehicle may be operable in a series mode in which the engine drives the generator means to develop charge to recharge the battery or power the propulsion motor whilst the propulsion motor delivers drive torque to the powertrain.

In a further aspect of the invention for which protection is sought there is provided a method of controlling a hybrid electric vehicle having an engine, electric propulsion means powered by energy storage means and electric generator means operable to be driven by the engine to recharge the energy storage means, the method comprising:

receiving a signal indicative of a required hybrid driving mode;

receiving a signal indicative of a state of charge of the energy storage means;

determining which of a plurality of powertrain operating modes is appropriate for vehicle operation at a given moment, the powertrain operating modes including an engine charging mode in which the engine drives the generator means to recharge the energy storage means and an electric vehicle (EV) mode in which the engine is switched off and the electric propulsion means is operable to develop drive torque to drive the vehicle;

and causing the powertrain to assume the appropriate powertrain operating mode and the required hybrid driving mode, the method comprising determining which of the plurality of powertrain operating modes is appropriate for vehicle operation in dependence at least in part on the signal indicative of the instant state of charge of the energy storage means and a reference value of state of charge, and setting the reference value of state of charge to one of a plurality of different respective values in dependence on the signal indicative of the required hybrid driving mode.

In one aspect of the invention for which protection is sought there is provided a computer readable medium carrying computer program code for controlling a vehicle to carry out a method according to a preceding aspect.

Within the scope of this application it is envisaged that the various aspects, embodiments, examples, features and alternatives set out in the preceding paragraphs, in the claims and/or in the following description and drawings may be taken independently or in any combination. Features described with reference to one embodiment are applicable to all embodiments, unless there is incompatibility of features.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described with reference to the accompanying figures in which.

DETAILED DESCRIPTION

Figure 1:
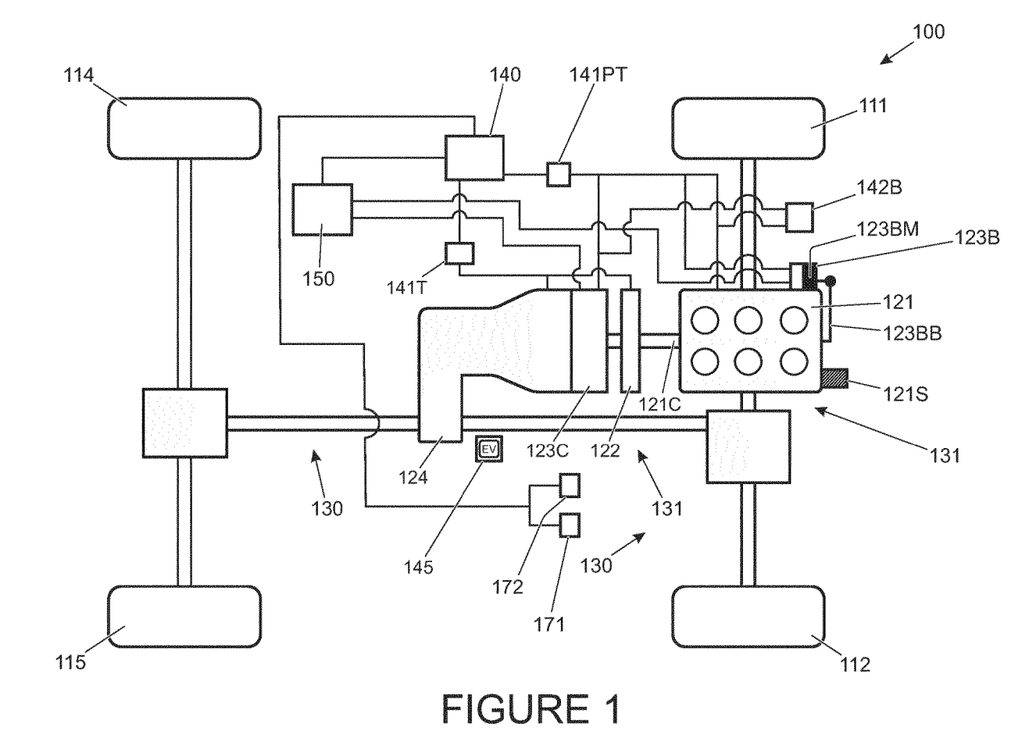
FIG. 1 is a schematic illustration of a hybrid electric vehicle according to an embodiment of the present invention.

In one embodiment of the invention a hybrid electric vehicle 100 is provided as shown in FIG. 1. The vehicle 100 has an engine 121 coupled to a belt integrated starter generator (BISG) 123B. The BISG 123B may also be referred to as a belt integrated (or belt mounted) motor generator and is operable to crank the engine 121 when starting is required. In addition or instead, a dedicated starter motor may be provided. In some embodiments therefore, a BISG may be provided but a separate starter motor is employed for starting the engine 121. The engine 121 is coupled in turn to a crankshaft-integrated starter/generator (CIMG) 123C by means of a clutch 122. The clutch 122 may also be referred to as a K0 clutch 122.

The CIMG 123C is integrated into a housing of a transmission 124 which is in turn coupled to a driveline 130 of the vehicle 100 thereby to drive a pair of front wheels 111, 112 and a pair of rear wheels 114, 115 of the vehicle 100. The driveline 130 in combination with the transmission 124, CIMG 123C, clutch 122, engine 121 and BISG 123B may be considered to form part of a powertrain 131 of the vehicle 100. Wheels 111, 112, 114, 115 arranged to be driven by the driveline 130 may also be considered to form part of the powertrain 131.

It is to be understood that other arrangements are also useful. For example the driveline 130 may be arranged to drive the pair of front wheels 111, 112 only or the pair of rear wheels 114, 115 only, or to be switchable between a two wheel drive mode in which the front or rear wheels only are driven and a four wheel drive mode in which the front and rear wheels are driven.

The BISG 123B and CIMG 123C are arranged to be electrically coupled to a charge storage module 150 having a battery and an inverter. The module 150 is operable to supply the BISG 123B and/or CIMG 123C with electrical power when one or both are operated as propulsion motors. Similarly, the module 150 may receive and store electrical power generated by the BISG 123B and/or CIMG 123C when one or both are operated as electrical generators. In some embodiments, the CIMG 123C and BISG 123B may be configured to generate different electrical potentials to one another. Accordingly, in some embodiments each is connected to a respective inverter adapted to operate at the corresponding potential of the CIMG 123C or BISG 123B. Each inverter may have a respective battery associated therewith. In some alternative embodiments the CIMG 123C and BISG 123B may be coupled to a single inverter which is adapted to receive charge from the CIMG 123C and BISG 123B at the respective potentials and to store the charge in a single battery. Other arrangements are also useful.

As noted above, the BISG 123B has an electric machine 123BM that is drivably coupled to a crankshaft 121C of the engine 121 by means of a belt 123BB. The BISG 123B is operable to provide torque to the crankshaft 121C when it is required to start the engine 121 or when it is required to provide torque-assist to the driveline 130 as discussed in further detail below.

The vehicle 100 has a vehicle controller 140 operable to command a powertrain controller 141PT to control the engine 121 to switch on or off and to generate a required amount of torque. The vehicle controller 140 is also operable to command the powertrain controller 141PT to control the BISG 123B to apply a required value of positive or negative torque (operating as a propulsion motor or a generator) to the engine 121. Similarly, the vehicle controller 140 may command the CIMG 123C to apply a required value of positive or negative torque (again operating as a propulsion motor or a generator) to the driveline 130 via the transmission 124.

The vehicle has an accelerator pedal 171 and a brake pedal 172. The accelerator pedal 171 provides an output signal to the vehicle controller 140 indicative of an amount by which the pedal 171 is depressed. The vehicle controller 140 is arranged to determine the amount of driver demanded torque based on the accelerator pedal position and one or more other vehicle parameters including engine speed W.

The vehicle 100 of FIG. 1 is operable by the vehicle controller 140 in an electric vehicle (EV) mode in which the clutch 122 is open and the crankshaft 121C is stationary. In EV mode the CIMG 123C is operable to apply positive or negative torque to the driveline 130 via the transmission 124. Negative torque may be applied for example when regenerative braking is required under the control of a brake controller 142B.

The powertrain 131 is operable in one of a plurality of parallel modes in which the engine 121 is switched on and the clutch 122 is closed. The parallel modes include a 'parallel boost' mode in which the CIMG 123C is operated as a motor to provide drive torque to the driveline 130 in addition to the torque provided by the engine 121. In the present embodiment the powertrain 131 is operated in the parallel boost configuration when the amount of driver demanded torque exceeds the maximum torque available from the engine 121. The amount of additional torque available from the CIMG 123C may be determined in dependence on the vehicle configuration as described in more detail below. It is to be understood that the feature of torque boost increases the available drive torque beyond that which is available from the engine 121 alone.

The parallel modes also include a parallel torque filling mode and a parallel torque assist mode. The parallel torque filling mode is a mode in which the CIMG 123C delivers drive torque to the driveline 130 in addition to the engine 121 in order to meet driver demand for torque more quickly than if the engine 121 alone delivers drive torque. Torque filling provides the benefit that driver torque demand may be satisfied more quickly, improving a responsiveness of the vehicle to an increase in torque demand.

In the present embodiment torque filling is implemented when a rate of increase of driver torque demand relative to the amount of torque delivered by the engine 121 exceeds a prescribed value. Once driver torque demand has been satisfied, the amount of torque delivered by the CIMG 123C decreases as the amount of torque delivered by the engine 121 increases to meet driver demand substantially entirely, without a requirement for additional torque from the CIMG 123C.

In the torque-assist parallel mode the CIMG 123C provides steady-state drive torque in addition to the engine 121 in order to relieve loading on the engine 121. This may assist in reducing fuel consumption. Torque-assist may be considered to be distinct from 'torque filling', the latter being employed in a transient manner when an increase in drive torque is required.

The powertrain 131 may alternatively be operated in a parallel recharge mode in which the CIMG 123C is driven as a generator by the engine 121 to recharge the charge storage module 150.

In the present embodiment, the vehicle 100 is also operable in one of a plurality of hybrid operating modes. The hybrid operating modes include a default hybrid electric vehicle (HEV) operating mode and a user-selectable EV hybrid operating mode, referred to herein as a 'selectable EV operating mode' (SEV operating mode). The SEV operating mode is selected by a user by means of SEV selector button 145 accessible to a driver whilst driving. When depressed, the SEV button 145 illuminates to confirm the SEV operating mode has been selected.

In the present embodiment the vehicle 100 is also operable in a selectable hybrid inhibit (SHI) hybrid operating mode in which the controller 140 causes the engine 121 to latch in the on condition, and in a command shift or lip shift' (TIP) hybrid operating mode.

Whether the vehicle is operating in the HEV hybrid operating mode, the SEV hybrid operating mode, the SHI hybrid operating mode or the TIP operating mode the controller 140 is configured to determine in which available powertrain mode the powertrain 131 should be operated in dependence on an energy optimisation strategy that employs game theory. It is to be understood that in the SHI hybrid operating mode the EV mode is not available since the engine 121 is latched in the on condition. The controller 140 is configured to take this factor into account in determining the required powertrain mode, however in the present embodiment the controller 140 still employs the same energy optimisation strategy. Other arrangements are also useful.

The non-cooperative approach of game theory is applied by considering a multi-stage game played by the following two players: a) a first player, the driver, represented by a discrete set of load sites (for example wheel torque, wheel speed and gear selected), covering the powertrain capability, and b) a second player, the powertrain, represented by a discrete set of operating modes.

The first player is interested in minimizing a cost functional while the second player is interested in maximizing the cost functional. The cost functional is formed as a sum of incremental cost values over a finite horizon.

In respect of the embodiment of FIG. 1 the cost functional of the game is based on the following incremental cost function L related to the control action, u, the state vector, x, and the operating variable, w:

$$L(x,u,w)=\alpha \times \text{Fuel}(u,w)+\beta \times \text{NOx}(u,w)+\mu \times [SoC_{SetPoint}-(x-\Delta SoC(u,w))]^2+\gamma \times G(w)$$

where $u \in U$ is the control action (U is the set of powertrain modes in this case which include the parallel boost mode and parallel recharge mode), $x \in X$ is the state vector (X is the set of discretised high voltage battery SoC (state of charge) values in this case) and $w \in W$ is the vector of operating variables which is also referred to as the load site (discretised wheel speed, wheel torque and gear selected in this case). In the above equation, Fuel denotes engine fuel consumption, NOx denotes engine NOx emission mass flow rate, $SoC_{SetPoint}$ denotes the desired SoC set-point at the end of the cycle, $\Delta SoC$ (u, w) denotes the deviation of SoC resulting from a defined control action at a given load site.

Here G denotes a positive Gaussian function with the centre at the centre of mass of a defined drive cycle, introduced to focus the optimization on specific load sites.

In the present embodiment, the value of SoC set-point (which may be referred to also as a target value or a reference value) is changed in dependence on whether the vehicle 100 is operated in the SEV mode, the HEV mode or the TIP mode. The SoC set-point may also be changed in dependence on transmission operating mode. The value of SoC set-point is set to a higher value for operation in the SEV mode, TIP mode and transmission sport operating mode (when in the HEV mode) compared with operation in the HEV mode in the drive transmission operating mode in order to promote charging of the charge storage module 150. In the present embodiment, if the vehicle 100 is operated in the SEV mode, TIP mode or if the transmission 124 is operated in the sport mode whilst in HEV mode, the value of SoC set-point (that is, Game Theory setpoint, also referred to as target value or reference value) is set to 65% (other values are also useful) whilst if the vehicle 100 is operated in the HEV mode (with the transmission in the drive mode) the value of SoC set-point is set to 52%. Other values are also useful. Similarly, other values of SoC set-point whilst operating in various hybrid and transmission operating modes are also useful. The fact that the value of SoC set-point is set to a higher value in the SEV mode causes the controller 140 to tend to charge the charge storage module 150 to higher values of state of charge (SoC). For operation in the SHI and TIP hybrid modes, the SoC set-point may be set to the same value as the HEV mode, or to any other suitable value.

Figure 2:
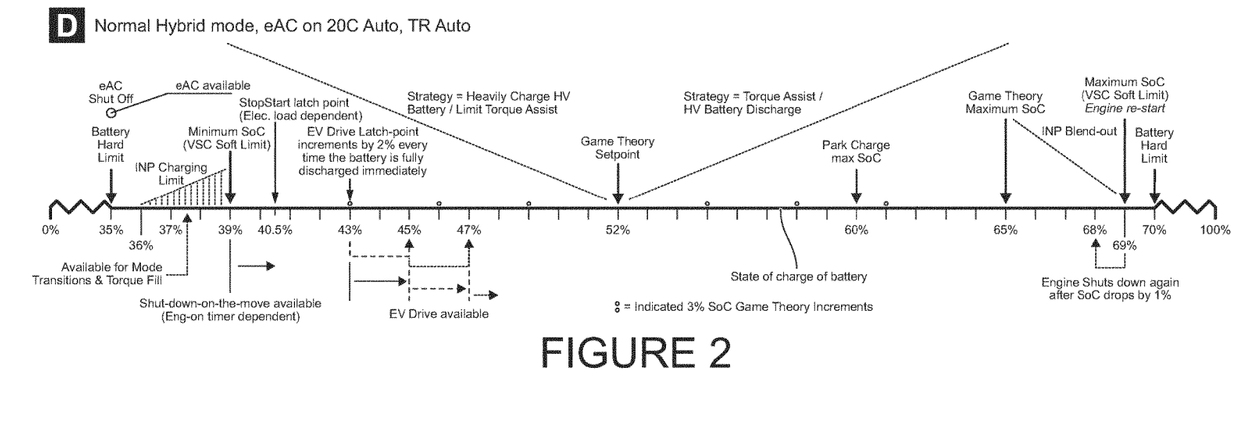
FIG. 2 illustrates operation of the vehicle of FIG. 1 in a general hybrid electric vehicle (HEV) driving mode.
Figure 3:
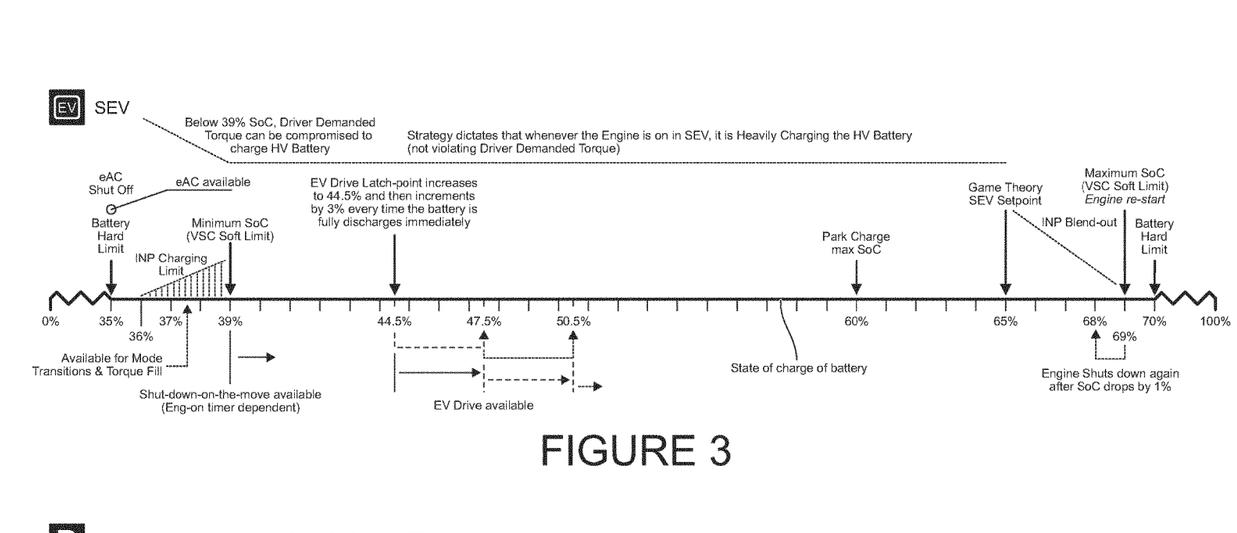
FIG. 3 illustrates operation of the vehicle of FIG. 1 in a selectable electric vehicle (SEV) driving mode.
Figure 4:
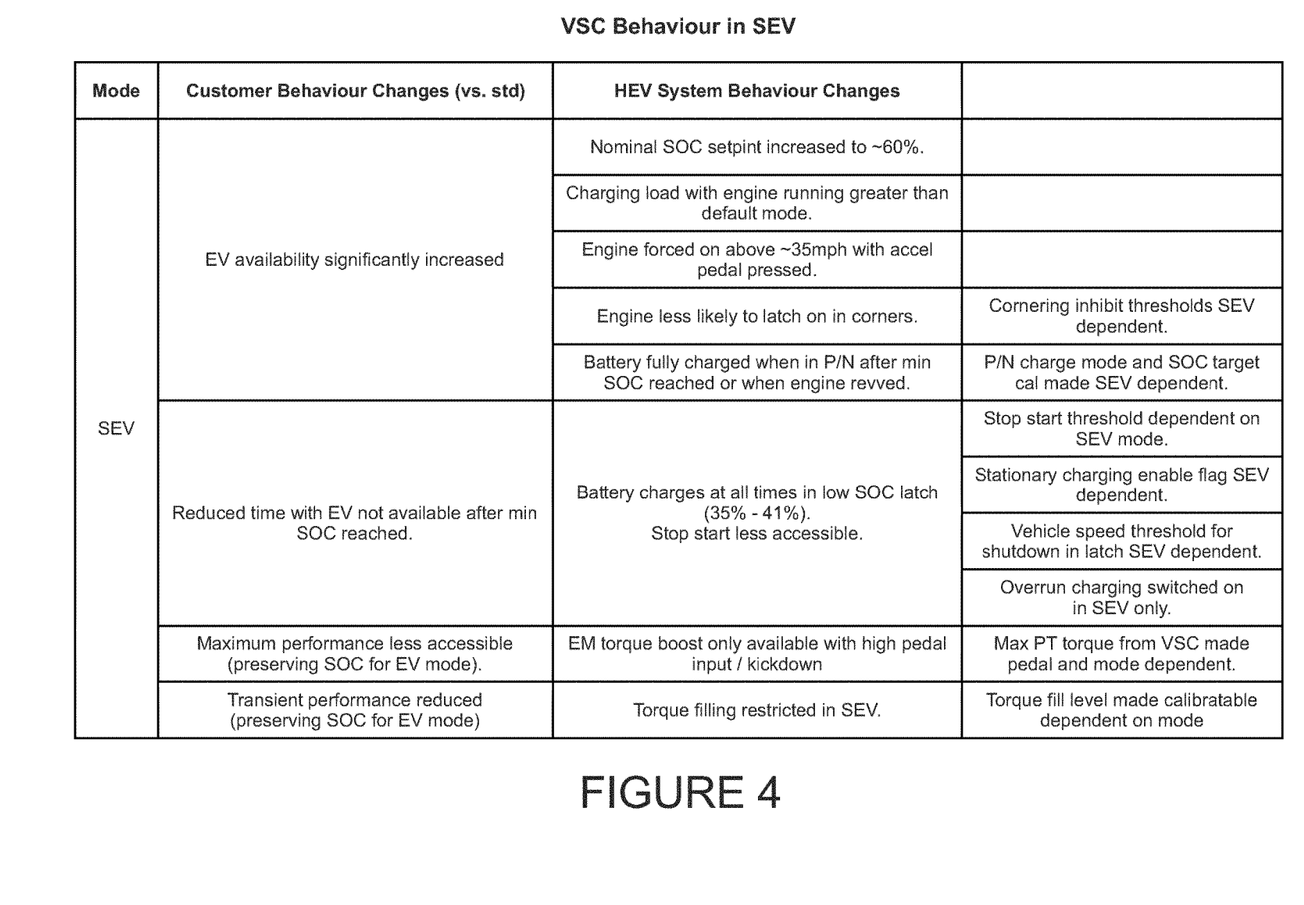
FIG. 4 is a table illustrating changes in vehicle behaviour when operating in the SEV mode compared with operation in the HEV mode.

FIG. 2 and FIG. 3 are graphical illustrations of the manner in which the controller 140 causes the vehicle 100 to operate when the HEV and SEV driving modes are selected, respectively. The figures show state of charge of the charge storage module 150 along a horizontal axis. The content of the figures will now be discussed.

In order to promote operation of the vehicle 100 in the EV mode when the vehicle is in the SEV mode, the controller 140 is configured to implement the following measures:

(a) When in SEV mode, the rate of charging of the charge storage module 150 when the powertrain is in the parallel recharge mode is increased relative to that employed in the HEV mode. The vehicle 100 is therefore able to spend longer periods of time in the EV mode for a given drive-cycle, satisfying the user requirement to increase the time in which the powertrain 131 spends in the EV powertrain mode.

(b) When in SEV mode, the engine 121 is forced to turn on at a higher engine-on threshold vehicle speed compared with operation in the HEV mode. In the present embodiment the engine 121 is forced to turn on when vehicle speed exceeds 35 mph and the accelerator pedal 171 is depressed, compared with 30 mph in the HEV mode. Other values are also useful. This feature reduces the chances of the engine 121 being switched on when a user is attempting to maintain a speed of 30 mph, for example when driving on a road having a speed limit of 30 mph. Thus the engine-on threshold speed may be set to a value exceeding that of a prevailing speed limit. If the accelerator pedal 171 is not depressed, the engine 121 may remain off even though vehicle speed exceeds the engine-on threshold. This is so as to avoid switching the engine 121 on unnecessarily when the engine-on threshold is exceeded, for example when coasting downhill.

(c) If the engine 121 switches on whilst the vehicle 100 is cornering in SEV mode, the controller 140 allows the engine 121 to switch off if the energy optimisation strategy determines this should be undertaken. In contrast, if the vehicle is operating in the HEV mode and the engine 121 switches on during cornering, the engine 121 is latched in the on state until the corner has been negotiated and the value of lateral acceleration falls below a prescribed value, indicative that the vehicle is no longer cornering, for a prescribed period of time, such as 5 s or more.

(d) If the transmission 124 of the vehicle 100 is placed in the park or neutral mode and a minimum allowable state of charge of the charge storage module 150 has been reached or is reached, the energy storage module 150 is charged at the maximum allowable rate of charge whenever the engine 121 develops sufficient power (or operates at a sufficiently high speed) to enable the CIMG 123C to be driven as a generator.

In some embodiments charging may not be performed if the engine is operating at idle speed, however if the engine speed is subject to an increase in response to depression of an accelerator pedal 171 by a driver the controller 140 takes the opportunity to recharge the energy storage module 150 by means of the CIMG 123C at as high a rate as can be achieved. In some embodiments the controller 140 may cause a speed of the engine 121 to increase in order to allow charging of the charge storage module 150.

(e) If the SoC of the charge storage module 150 falls below a first prescribed value (which may be referred to as a minimum SoC or soft minimum limit) when the vehicle is operating in the SEV hybrid mode, the engine 121 is latched on and the CIMG 123C is operated as a generator to recharge the charge storage module 150 at the fastest allowable rate. In contrast, in the HEV hybrid mode the controller 140 causes the CIMG 123C to recharge at a rate determined in dependence on the energy optimisation strategy. The controller 140 suspends application of game theory to determine the preferred powertrain operating mode when the SoC falls below the first prescribed value. In the present embodiment the first prescribed value is around 39% although other values are also useful.

It is to be understood that in known hybrid electric vehicles and electric vehicles, a battery for storing charge is only permitted to vary its SoC between prescribed values (which may be referred to as hard limits) that lie within the absolute maximum and minimum states of charge in order to prevent deterioration in battery life due to excessively high and low charge states. In the present embodiment the minimum allowable battery SoC is 35% whilst the maximum allowable SoC is 70%. Other values are also useful.

(f) The vehicle 100 may not operate in the HEV hybrid mode if the SoC falls below a second prescribed value (or prescribed soft minimum value) which may be greater or less than the abovementioned first prescribed value. The SoC interval from the absolute minimum SoC to the second prescribed value is reserved specifically for the SEV hybrid mode. This will enable vehicle 'pull-away' in the EV mode upon initialisation of the vehicle 100. Specifically, the SoC is permitted to be less than the second prescribed value if the SEV hybrid mode is selected by the driver or the vehicle 100 has just been initialised. If the SoC assumes a value that is less than the prescribed second value, the SoC is no longer permitted to be less than said second prescribed value if the SEV hybrid mode is not selected or deselected and the SoC subsequently assumes a value greater than the second prescribed value. The SoC interval from the absolute minimum SoC to the second prescribed value may be approximately 10% of the permitted SoC interval (that is, the interval from the absolute minimum SoC to the absolute maximum SoC). Other values are also useful.

In the present embodiment, if the SoC of the charge storage module 150 reaches a value below a prescribed engine start SoC value, the controller 140 forces the powertrain to assume the parallel recharge mode until the SoC of the charge storage module 150 exceeds a prescribed minimum engine stop SoC value. Once the SoC exceeds the minimum engine stop SoC value the powertrain 131 may resume operation in the EV mode if the controller 140 determines this is the optimum mode according to the energy optimisation strategy. If the powertrain 131 resumes operation in the EV mode once the SoC exceeds the prescribed minimum engine stop SoC value following an engine start due to the SoC falling below the engine start SoC value, the minimum engine stop SoC value is incremented by a prescribed increment amount. In the present embodiment, the prescribed increment amount is higher when operating in SEV mode compared with HEV mode although in some embodiments the increment amounts may be substantially equal. This feature has the effect that when the engine 121 is next started, it must charge the energy storage module 150 to a higher SoC before the engine 121 may be switched off, increasing the available charge for operation in EV mode.

In the present embodiment, when operating in HEV mode the prescribed increment amount is 2% each time the engine is stopped as soon as the SoC reaches the minimum engine stop SoC value. When operating in SEV mode the prescribed increment amount is 3%. Other values are also useful.

Advantageously, the minimum engine stop SoC is higher when operating in the SEV mode compared with the HEV mode. This allows longer uninterrupted periods of operation in EV mode in a number of situations. In the present embodiment the minimum engine stop SoC is around 43% when operating in HEV mode and around 44.5% when operating in SEV mode. Other values are also useful.

This feature has the advantage that a time period for which the powertrain 131 operates in EV mode may be increased.

When the powertrain 131 is operated in a parallel mode, the controller 140 is operable to assume the parallel torque boost mode when an amount of driver torque demand exceeds that which may be provided by the engine 121 alone at its maximum torque output. As noted above, driver torque demand is related to accelerator pedal position. In the SEV mode, the controller 140 limits provision of torque boost to situations in which the accelerator pedal is depressed more than a prescribed amount (which may be specified in terms of a proportion of full travel in some embodiments). In the present embodiment, when the vehicle is operated in the SEV mode the parallel torque boost mode is only permitted when the accelerator pedal 171 is depressed by more than 95%, corresponding to movement of the pedal 171 beyond the 'kick down' detent in the present embodiment. Other arrangements are also useful. However, this feature advantageously reduces draining of charge from charge storage module 150 relative to operation in the HEV hybrid operating mode.

In some embodiments the controller 140 may suspend provision of torque boost in the SEV mode altogether.

Furthermore, the provision of torque filling is also restricted when in the SEV mode compared with the HEV mode. In some embodiments torque filling is not permitted in the SEV mode.

In some embodiments, energy overrun charging (i.e. use of the engine to drive the CIMG 123C in order to slow the vehicle when the engine 121 is switched on) is not permitted in the HEV mode, but is permitted in the SEV mode. Other arrangements are also useful.

It is to be understood that the controller 140 is configured to store computer program code for causing one or more computing devices of the controller 140 to perform the method of vehicle control described herein. It is to be understood that a controller according to an embodiment of the present invention may be provided by a plurality of computing devices. The functionality described as being performed by the controller may be performed by a plurality of computing devices, control modules or the like, optionally at different physical locations of a vehicle.

Embodiments of the present invention may be understood by reference to the following numbered paragraphs:

1. A controller for a hybrid electric vehicle having an engine, an electric propulsion motor powered by an energy storage device and an electric generator operable to be driven by the engine to recharge the energy storage device, the controller being operable to:
   receive a signal indicative of a required hybrid operating mode of the vehicle;
   receive a signal indicative of a state of charge of the energy storage device;
   determine which of a plurality of powertrain modes is appropriate for vehicle operation at a given moment, the powertrain modes including an engine charging mode in which the engine drives the generator to recharge the energy storage device and an electric vehicle (EV) mode in which the engine is switched off and the electric propulsion motor is operable to develop drive torque to drive the vehicle; and
   cause the powertrain to assume the appropriate powertrain mode according to the required hybrid operating mode,
   wherein the controller is operable to determine which of the plurality of powertrain modes is appropriate for vehicle operation in dependence at least in part on the signal indicative of the instant state of charge of the energy storage device and a reference value of state of charge, the controller being operable to set the reference value of state of charge to one of a plurality of different respective values in dependence on the signal indicative of the required hybrid operating mode.

2. A controller according to paragraph 1 operable to determine the appropriate powertrain mode in dependence at least in part on a deviation of the signal indicative of the instant state of charge from the reference value of state of charge.

3. A controller according to paragraph 1 operable to determine which of the powertrain modes is appropriate at a given moment in time according to a value of a cost function for each powertrain mode, the value of the cost function being determined at least in part by reference to the signal indicative of the instant state of charge and the reference value of state of charge of the respective powertrain modes.

4. A controller according to paragraph 3 wherein the value of the cost function of each powertrain mode is determined at least in part in further dependence on at least one selected from amongst a rate of fuel consumption of the vehicle, a rate of emission of a gas by the vehicle and an amount of noise generated by the vehicle.

5. A controller according to paragraph 4 configured to determine the required powertrain mode according to a feedback Stackelberg equilibrium control optimisation methodology.

6. A controller according to paragraph 1 arranged to receive a signal indicative of the required hybrid operating mode from a user.

7. A controller according to paragraph 1 wherein the hybrid operating modes include a first operating mode favouring prolonged operation in EV mode, and a second operating mode favouring a reduction in fuel consumption, wherein the value of reference state of charge in the first operating mode is higher than that in the second operating mode.

8. A controller according to paragraph 7 wherein when the powertrain is in the EV powertrain mode the controller is operable to cause the powertrain to assume the engine charging powertrain mode in dependence at least in part on driver torque demand, wherein when the first mode is selected the controller is configured to cause the vehicle to assume the engine charging powertrain mode only at higher values of driver torque demand than when the second operating mode is selected.

9. A controller according to paragraph 7 wherein when the powertrain is in the engine charging operating mode the controller is configured to cause the generator to apply a greater charging load to the engine when the vehicle is in the first operating mode compared with the second operating mode.

10. A controller according to paragraph 7 wherein the controller is operable to cause the engine to switch on when vehicle speed exceeds a prescribed value, the prescribed value being higher when the vehicle is operating in the first mode relative to the second mode.

11. A controller according to paragraph 10 wherein when the controller causes the vehicle to operate in the first hybrid mode or the second hybrid mode, the controller is arranged to cause the engine to turn on in dependence at least in part on an amount by which an accelerator pedal is depressed.

12. A controller according to paragraph 7 wherein the state of charge of the energy storage means is permitted to take a value from a prescribed absolute minimum state of charge to a prescribed soft minimum value greater than the prescribed absolute minimum state of charge only when the vehicle is operating in the first hybrid operating mode or upon vehicle initialisation.

13. A controller according to paragraph 12 wherein the magnitude of the interval from the prescribed absolute minimum state of charge to the prescribed soft minimum value is approximately 10% of the magnitude of the interval from the prescribed absolute minimum state of charge to a prescribed absolute maximum state of charge.

14. A controller according to paragraph 1 operable to cause the engine to be drivably coupled to one or more wheels of the vehicle in addition to the electric propulsion motor.

15. A controller according to paragraph 14 operable to cause the engine to deliver drive torque when the powertrain is operated in the engine charging mode.

16. A controller according to paragraph 14 operable to cause the powertrain to operate in a parallel mode in which the engine delivers drive torque to one or more wheels in addition to the electric propulsion motor.

17. A hybrid electric vehicle powertrain comprising a controller according to paragraph 1.

18. A powertrain according to paragraph 17 wherein the electric generator and the electric propulsion motor are each provided by an electric machine.

19. A powertrain according to paragraph 18 wherein the controller is operable to cause the electric machine to be operated as a propulsion motor or as a generator. Optionally, a single electric machine may be provided, performing the functions of a generator or a propulsion motor as required.

20. A powertrain according to paragraph 17 wherein the generator and electric propulsion motor are provided by respective different electric machines.

21. A hybrid electric vehicle comprising a controller according to paragraph 1 or a powertrain according to paragraph 15.

22. A vehicle according to paragraph 21 operable in a parallel mode in which the engine delivers drive torque to the powertrain.

23. A vehicle according to paragraph 21 operable in a series mode in which the engine drives the generator to develop charge to recharge the battery or power the propulsion motor whilst the propulsion motor delivers drive torque to the powertrain.

24. A method of controlling a hybrid electric vehicle having an engine, electric propulsion motor powered by an energy storage device and an electric generator operable to be driven by the engine to recharge the energy storage device, the method comprising:
receiving a signal indicative of a required hybrid operating mode;
receiving a signal indicative of a state of charge of the energy storage device;
determining which of a plurality of powertrain operating modes is appropriate for vehicle operation at a given moment, the powertrain operating modes including an engine charging mode in which the engine drives the generator to recharge the energy storage device and an electric vehicle (EV) mode in which the engine is switched off and the electric propulsion motor is operable to develop drive torque to drive the vehicle; and
causing the powertrain to assume the appropriate powertrain operating mode and the required hybrid operating mode,
the method comprising determining which of the plurality of powertrain operating modes is appropriate for vehicle operation in dependence at least in part on the signal indicative of the instant state of charge of the energy storage device and a reference value of state of charge, and setting the reference value of state of charge to one of a plurality of different respective values in dependence on the signal indicative of the required hybrid operating mode.

25. A computer readable medium carrying computer program code for controlling a vehicle to carry out the method of paragraph 24.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a hybrid electric vehicle having a powertrain comprising an engine, an electric propulsion motor powered by a battery, and an electric generator operable to be driven by the engine to recharge the battery, the controller configured to:
receive a signal indicative of a required hybrid operating mode of the vehicle;
receive a signal indicative of a state of charge of the battery;
determine which of a plurality of powertrain modes is appropriate for vehicle operation at a given moment, the powertrain modes including an engine charging mode in which the engine drives the electric generator to recharge the battery and an electric vehicle (EV) powertrain mode in which the engine is switched off and the electric propulsion motor is operable to develop drive torque to drive the vehicle; and
cause the powertrain to assume the appropriate powertrain mode according to the required hybrid operating mode, wherein hybrid operating modes include a first hybrid operating mode favoring prolonged operation in the EV powertrain mode by promoting charging of the battery to a higher state of charge when the powertrain is in the engine charging mode, and a second hybrid operating mode favoring a reduction in fuel consumption,
wherein the controller is operable to determine which of the plurality of powertrain modes is appropriate for vehicle operation in dependence at least in part on a signal indicative of an instant state of charge of the battery and a reference value of state of charge, the reference value in the first hybrid operating mode being higher than that in the second hybrid operating mode, and the controller being operable to set the reference value of state of charge to one of a plurality of different respective values in dependence on the signal indicative of the required hybrid operating mode and additionally in dependence on a selected transmission mode, the selected transmission mode being one of a plurality of selectable transmission modes.

2. The controller of claim 1, configured to determine the appropriate powertrain mode in dependence on a deviation of the signal indicative of the instant state of charge from the reference value of state of charge.

3. The controller of claim 1, configured to determine which of the powertrain modes is appropriate at a given moment in time according to a value of a cost function for each powertrain mode, the value of the cost function being determined by reference to the signal indicative of the instant state of charge and the reference value of state of charge of the respective powertrain modes.

4. The controller of claim 3, wherein the value of the cost function of each powertrain mode is determined in further dependence on at least one selected from amongst a rate of fuel consumption of the vehicle, a rate of emission of a gas by the vehicle and an amount of noise generated by the vehicle, and wherein the controller is configured to determine a required powertrain mode according to a feedback Stackelberg equilibrium control optimization methodology.

5. The controller of claim 1, configured to receive a signal indicative of the required hybrid operating mode from a user.

6. The controller of claim 1, wherein, when the powertrain is in the EV powertrain mode, the controller is operable to cause the powertrain to assume the engine charging powertrain mode in dependence on driver torque demand, wherein when the first hybrid operating mode is selected the controller is configured to cause the vehicle to assume the engine charging powertrain mode only at higher values of driver torque demand than when the second hybrid operating mode is selected.

7. The controller of claim 1, wherein, when the powertrain is in the engine charging operating mode, the controller is configured to cause the electric generator to apply a greater charging load to the engine when the vehicle is in the first hybrid operating mode compared with the second hybrid operating mode.

8. The controller of claim 1, wherein the controller is operable to cause the engine to switch on when vehicle speed exceeds a prescribed value, the prescribed value being higher when the vehicle is operating in the first hybrid operating mode relative to the second hybrid operating mode, wherein the prescribed value when the vehicle is operating in the first hybrid operating mode is set to a value exceeding that of a prevailing speed limit of a road which the vehicle is driving on.

9. The controller of claim 1, wherein the controller is configured to command the powertrain to assume the engine charging mode when the second hybrid operating mode is selected and the state of charge of the battery is below a prescribed soft minimum value state of charge, the soft minimum value state of charge being greater than a prescribed absolute minimum value state of charge, wherein the controller is configured to determine whether it is appropriate for the powertrain to assume the engine charging powertrain mode or the EV powertrain mode when the vehicle is operating in the first hybrid operating mode or upon vehicle initialization and the state of charge is below the prescribed soft minimum value state of charge, wherein a magnitude of an interval from the prescribed absolute minimum value state of charge to the prescribed soft minimum value state of charge is approximately 10% of the magnitude of the interval from the prescribed absolute minimum value state of charge to a prescribed absolute maximum value state of charge.

10. The controller of claim 1, further configured to cause the engine to be drivably coupled to one or more wheels of the vehicle in addition to the electric propulsion motor.

11. The controller of claim 10, further configured to cause the engine to deliver drive torque when the powertrain is operated in the engine charging mode.

12. The controller of claim 10, further configured to cause the powertrain to operate in a parallel mode in which the engine delivers drive torque to one or more wheels in addition to the electric propulsion motor.

13. A hybrid electric vehicle comprising a powertrain comprising an engine, an electric propulsion motor powered by a battery, an electric generator operable to be driven by the engine to recharge the battery, and a controller, the controller configured to:
receive a signal indicative of a required hybrid operating mode of the vehicle;
receive a signal indicative of a state of charge of the battery;
determine which of a plurality of powertrain modes is appropriate for vehicle operation at a given moment, the powertrain modes including an engine charging mode in which the engine drives the electric generator to recharge the battery and an electric vehicle (EV) powertrain mode in which the engine is switched off and the electric propulsion motor is operable to develop drive torque to drive the vehicle; and
cause the powertrain to assume the appropriate powertrain mode according to the required hybrid operating mode, wherein hybrid operating modes include a first hybrid operating mode favoring prolonged operation in the EV powertrain mode by promoting charging of the battery to a higher state of charge when the powertrain is in the engine charging mode, and a second hybrid operating mode favoring a reduction in fuel consumption,
wherein the controller is operable to determine which of the plurality of powertrain modes is appropriate for vehicle operation in dependence at least in part on a signal indicative of an instant state of charge of the battery and a reference value of state of charge, the reference value in the first hybrid operating mode being higher than that in the second hybrid operating mode, and the controller being operable to set the reference value of state of charge to one of a plurality of different respective values in dependence on the signal indicative of the required hybrid operating mode and additionally in dependence on a selected transmission mode, the selected transmission mode being one of a plurality of selectable transmission modes.

14. The vehicle of claim 13, wherein the electric generator and electric propulsion motor are provided by respective different electric machines.

15. The vehicle of claim 13, wherein the electric generator and the electric propulsion motor are each provided by an electric machine, and wherein the controller is configured to cause the electric machine to be operated as the electric propulsion motor or as the electric generator.

16. The vehicle of claim 13, further configured to operate in a parallel mode in which the engine delivers drive torque to the powertrain.

17. The vehicle of claim 13, further configured to operate in a series mode in which the engine drives the electric generator to develop charge to recharge the battery or power the electric propulsion motor while the electric propulsion motor delivers drive torque to the powertrain.

18. A method of controlling a hybrid electric vehicle having a powertrain comprising an engine, an electric propulsion motor powered by a battery, and an electric generator configured to be driven by the engine to recharge the battery, the method comprising:

receiving a signal indicative of a required hybrid operating mode;

receiving a signal indicative of a state of charge of the battery;

determining which of a plurality of powertrain operating modes is appropriate for vehicle operation at a given moment, the powertrain operating modes including an engine charging mode in which the engine drives the electric generator to recharge the battery and an electric vehicle (EV) powertrain mode in which the engine is switched off and the electric propulsion motor is configured to develop drive torque to drive the vehicle; and causing the powertrain to assume the appropriate powertrain operating mode and the required hybrid operating mode, wherein hybrid operating modes include a first hybrid operating mode favoring prolonged operation in the EV powertrain mode by promoting charging of the battery to a higher state of charge when the powertrain is in the engine charging mode, and a second hybrid operating mode favoring a reduction in fuel consumption, the method comprising determining which of the plurality of powertrain operating modes is appropriate for vehicle operation in dependence on a signal indicative of an instant state of charge of the battery and a reference value of state of charge, the reference value in the first hybrid operating mode being higher than in the second hybrid operating mode, and setting the reference value of state of charge to one of a plurality of different respective values in dependence on the signal indicative of the required hybrid operating mode and additionally in dependence on a selected transmission mode, the selected transmission mode being one of a plurality of selectable transmission modes.

19. A computer readable medium carrying computer program code for controlling a vehicle to carry out the method of claim 18.

20. The controller of claim 1, wherein if the state of charge reaches a value below a prescribed engine start value of the state of charge, the controller commands the engine to start and the powertrain to assume the engine charging mode until the state of charge exceeds a prescribed minimum engine stop value of the state of charge, wherein once the state of charge exceeds the minimum engine stop value of the state of charge the powertrain may resume operation in the EV powertrain mode if the controller determines this is the optimum powertrain mode according to an energy optimization strategy, and wherein if the powertrain resumes operation in the EV powertrain mode once the state of charge exceeds the prescribed minimum engine stop value of the state of charge following an engine start due to the state of charge falling below the engine start value of the state of charge causing the powertrain to assume the engine charging mode, the minimum engine stop value of the state of charge is incremented by a prescribed increment amount.

* * * * *